United States Patent [19]

Penny

[11] 3,789,215

[45] Jan. 29, 1974

[54] PHOTOSENSITIVE DOCUMENT DETECTOR WITH AUTOMATIC COMPENSATION

[75] Inventor: Robert Elton Penny, Raleigh, N.C.

[73] Assignee: International Business Machines Corporation, Armonk, N.Y.

[22] Filed: Sept. 8, 1972

[21] Appl. No.: 287,301

[52] U.S. Cl. .............................. 250/206, 250/219 D
[51] Int. Cl. .............................. G01n 21/30
[58] Field of Search.. 250/219 D, 219 DC, 214, 206

[56] References Cited

UNITED STATES PATENTS 3,660,670 5/1972 Howard ........................ 250/219 DC

*Primary Examiner*—James W. Lawrence
*Assistant Examiner*—T. N. Grigsby
*Attorney, Agent, or Firm*—John B. Frisone

[57] ABSTRACT

A photosensitive circuit for use in document handling equipment which detects the passage of single and multiple documents past a counting station or the like and in which component aging or other variation is automatically compensated.

2 Claims, 5 Drawing Figures

PHOTOSENSITIVE DOCUMENT DETECTOR WITH AUTOMATIC COMPENSATION

BACKGROUND OF THE INVENTION

1. Field of the Invention

The invention relates to detector circuits in general and more particularly to photodetector circuits suitable for detecting documents or the like in document handling equipment.

2. Description of the Prior Art

Photodetectors and associated circuits have been utilized for detecting documents at counting stations or the like in document handling equipment. They have also been used for detecting overlapped or double documents. Generally the equipment includes a lamp for illuminating the document path and a photodetector which responds each time a document interrupts the light path to the photodetector. Since documents such as currency, are translucent to a limited degree, these same techniques may be utilized to detect overlapped or multiple documents in the document path.

In order to detect the passage of single or multiple documents, thresholds must be established against which the output of the detector must be compared. In the case of multiple document detection, the threshold levels must be precisely controlled. The generation of the threshold level has not proven a problem, however, long term variations in the output of the light source requires the periodic adjustment of the established threshold. Variations in other circuit components require similar adjustments, however, to a far lesser degree.

SUMMARY OF THE INVENTION

The invention contemplates a compensating photosensitive document detector comprising a light source for illuminating a document path and a photodetector positioned with respect to said path such that documents traversing the path interrupt the illumination of the detector, first circuit means connected to said detector for converting the current output to a corresponding voltage, second circuit means responsive to said first circuit means for continually sampling the voltage supplied by said first circuit means and providing an output voltage corresponding to the peak voltage supplied by said first circuit means, and third circuit means responsive to the first and second circuit means for providing an output when the output voltages provided by the first and second circuit means bear a predetermined relationship to each other whereby the status of the document path may be determined.

One object of the invention is to provide a photosensitive document detector which automatically adjusts to changing component values.

Another object of the invention is to provide a photosensitive document detector which is reliable in operation.

A further object of the invention is to provide a photosensitive document detector which is capable of reliably detecting overlapped or multiple documents in a document handling path.

The foregoing and other objects, features and advantages of the invention will be apparent from the following more particular description of a preferred embodiment of the invention, as illustrated in the accompanying drawings.

DESCRIPTION OF THE PREFERRED EMBODIMENTS

Figure 1:
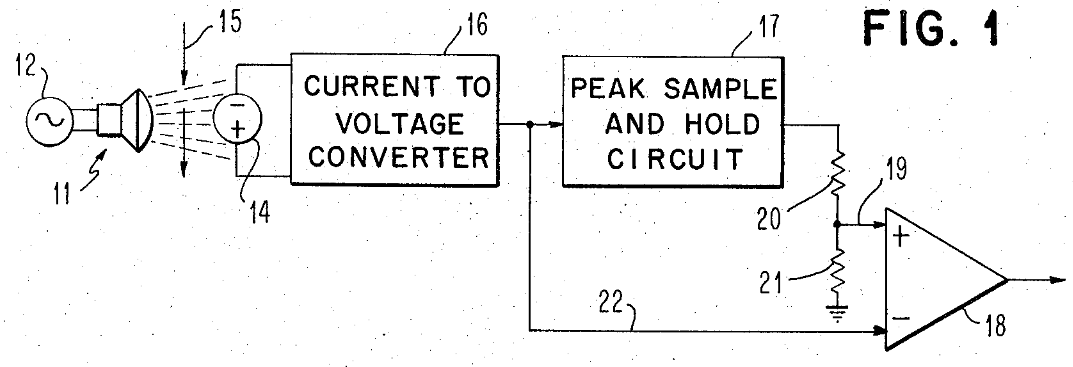
FIG. 1 is a block diagram of a novel photosensitive document detector constructed in accordance with the invention.

In FIG. 1 a light source 11 connected to a power source 12 illuminates a photosensitive cell 14 which provides a current corresponding to the intensity of the incident illumination. The light source 11 and the cell 14 are arranged on opposite sides of a document path 15. When documents traveling down the path 15 are positioned between source 11 and cell 14 they partially block the light reaching cell 14 from source 11 thus reducing or amplitude modulating the output current from cell 14. Overlapped or double documents will cause a greater reduction in the output of cell 14 than single documents and thus may be differentiated from single documents. Thus, the output of cell 14 may be utilized to detect the passage of single documents as well as overlapped or double documents.

Cell 14 is connected to a current to voltage converter circuit 16 which provides a voltage level corresponding to the magnitude of the current received from cell 14. The output of circuit 16 is applied to a peak sample and hold circuit 17 which provides an output voltage corresponding to the peak voltage supplied by circuit 16. Peak sample and hold circuit 17 is provided with a fast build up rate to the peak voltage achieved by circuit 16 and a slow leak down rate. Thus, during the time that a document is between the source 11 and cell 14 the output of circuit 17 remains proportional to the unobstructed photocurrent from cell 14. How this is achieved will become apparent as the description continues.

A comparator circuit 18 has one input 19 connected via a voltage divider network including a pair of resistors 20 and 21 to the output of circuit 17 and another input 22 connected directly to the output of circuit 16. Comparator 18 compares a fixed percentage of the peak or unobstructed light output from cell 14 via circuits 16, 17 and divider network 20 and 21 with the output of circuit 16. When, due to the passage of a document, the cell output drops below a percentage of the immediately previous unobstructed value the comparator 18 provides an output signalling the condition. Depending on the percentage selected, the output from comparator 18 may indicate the passage of a single document or the passage of overlapped or multiple documents. An operational amplifier such as Type 741 or equivalent may be used as the comparator 18.

From the above, it should be apparent that aging or changes in components such as light source 11 will have no effect on the reliability of the detection process since the comparison is made between a fixed percentage of the unobstructed value of the output of cell 14 and the obstructed value. As long as changes in, for example, the light intensity from source 11 are within a substantially linear range of the light transmission characteristics of the document the changes will have no effect on the reliability of detection. In addition, there is no need for recalibration since the circuit is automatically calibrated each time unobstructed light sets peak sample and hold circuit 17.

Figure 2:
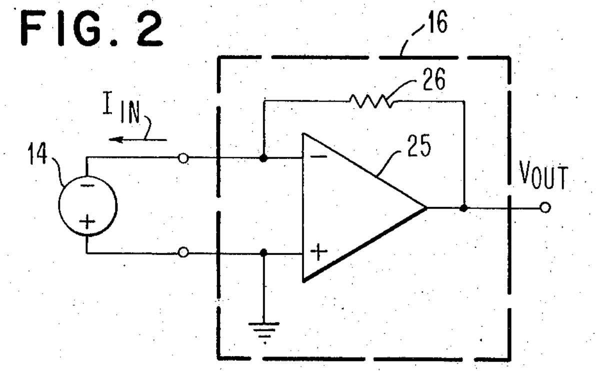
FIG. 2 is a schematic diagram of the current to voltage converter illustrated in block form in FIG. 1.

Current to voltage converter circuit 16 is illustrated in FIG. 2 and includes an operational amplifier 25 and a feedback resistor 26 connected as illustrated.

$$V_{out} = R_{26} \cdot I_{in}$$

Figure 3:
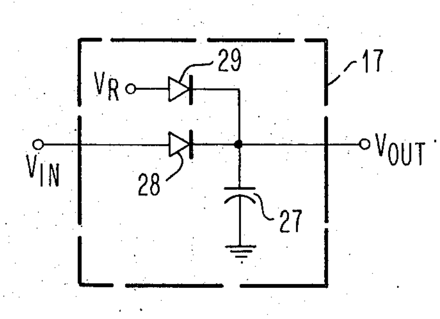
FIGS. 3 and 4 are schematic diagrams of alternative peak sample and hold circuits illustrated in block form in FIG. 1.
Figure 4:
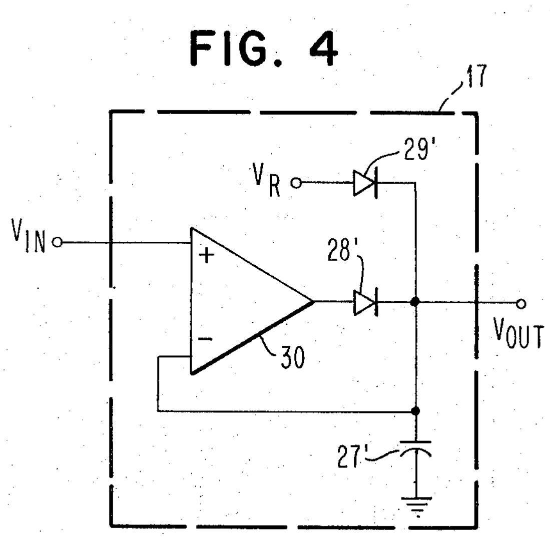

Two peak sample and hold circuits 17 are illustrated in FIGS. 3 and 4. The circuit illustrated in FIG. 3 includes a grounded capacitor 27 connected to the output of circuit 16 by a diode 28 and to a reference voltage supply by a second diode 29. As the output voltage supplied by circuit 16 rises, capacitor 27 charges and the output voltage taken at the junction of diode 28 and capacitor 27 follows except for the drop across diode 28. As the voltage output of circuit 16 falls diode 28 reverse biases and capacitor 27 maintains the peak voltage. Capacitor 27 will discharge very slowly through resistors 20 and 21, however, it is recharged to peak value prior to any substantial discharge since discharge only occurs as a document passes between source 11 and detector 14.

The voltage of the source connected via diode 29 is lower than the normal range of the peak voltage from circuit 16 and in the event of a lamp burn out or photocell failure, it provides a constant detected output level at the comparator 18 which indicates a failure.

The peak sample and hold circuit illustrated in FIG. 4 is substantially identical to the circuit illustrated in FIG. 3, however, an operational amplifier 30 connected as illustrated eliminates the diode drop across diode 28'. The drop is eliminated by the feedback across the series connected diode and amplifier. This circuit is particularly useful where overlapped or double documents are to be detected. Operational amplifiers 25 and 30 may also be type 741 or equivalent.

Figure 5:
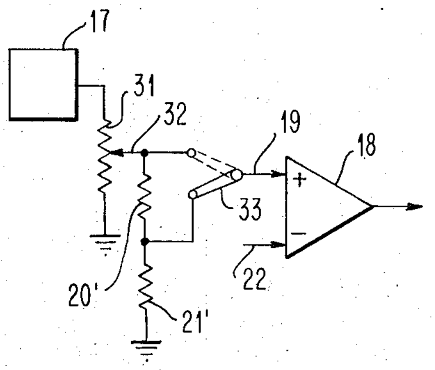
FIG. 5 is a partial schematic diagram of an alternative of FIG. 1.

An alternative for divider network (20, 21) is illustrated in FIG. 5. The alternate circuit includes a potentiometer 31 connected between the output of circuit 17 and ground. The wiper 32 of potentiometer 31 is connected to a voltage divider including a pair of series resistors 20' and 21'. A single pole double throw switch 33 connects wiper 32 to input 19 when the switch 33 is in one position (dotted) and the common junction of resistors 20' and 21' to input 19 when it occupies the alternate position (solid line). This arrangement is useful where overlapped or double documents must be detected. The switch 33 is placed in the dotted position for setting the threshold level. While in this position single documents are fed repeatedly through the sensing mechanism. The potentiometer 31 is adjusted until the single document just causes a reject signal. At this time, switch 33 is moved to the solid position which lowers the threshold value by a fixed percentage. The percentage is selected such that single documents will pass without generating the reject signal, however, double or overlapped documents cause the reject signal to be generated.

While the invention has been particularly shown and described with reference to preferred embodiments thereof, it will be understood by those skilled in the art that various changes in form and details may be made therein without departing from the spirit and scope of the invention.

What is claimed is:

1. A compensating photosensitive document detector comprising:

a photodetector;

a light source for simultaneously illuminating a document path and said photodetector, said photodetector and light source being positioned with respect to said path such that documents traversing the path interrupt the illumination of the detector;

first circuit means connected to said detector for converting the current output supplied by said detector to a corresponding voltage;

second circuit means responsive to said first circuit means for continuously sampling the voltage signal supplied by said first circuit means and providing an output voltage corresponding to the peak voltage supplied by said first circuit means; and third circuit means responsive to said first and second circuit means for providing an output when the output voltages provided by the first and second circuit means bear a predetermined relationship to each other whereby the status of the document path may be determined, said third circuit means including;

a voltage divider network connected to the output of said second second circuit means for providing a voltage which is a fixed percentage of the output from the said second circuit means and further providing an adjustment of the percentage, said voltage divider network comprising a potentiometer connected between the output of the said second circuit means and a reference potential, a voltage divider circuit connected between said reference potential and the wiper of the said potentiometer whereby adjustment of the potentiometer wiper adjusts the voltage supplied across the voltage divider circuit and switching means for selectively connecting a first and a second point on the said voltage divider network to provide an output;

a comparator having a first input connected to said switching means and a second input connect to the said first circuit means for providing an output whenever the voltage provided by the said first circuit means falls below the voltage provided by the said switching means, said switching means in its first position being used to calibrate the voltage divider network to secure an output from the comparator when a single document intervenes between the said light source and the detector and in its alternate position providing an output to secure an output from the comparator when two or more documents in overlapped relationship intervene between the light source and the photodetector.

2. A compensating photosensitive document detector circuit as set forth in claim 1 in which said second circuit means includes a capacitor connected to a reference potential, a series connected operational amplifier and a diode connected between said first circuit means and said capacitor and feedback means across said series connected amplifier and diode whereby the output voltage at the common junction of the diode and the capacitor represents the peak voltage supplied by the said first circuit means.

* * * * *